April 25, 1967 E. C. KARRAS 3,316,502

SINEWAVE RINGING GENERATOR INCLUDING A PHASE SHIFT OSCILLATOR OPERATED IN A SATURATED MODE

Filed June 7, 1965 2 Sheets-Sheet 1

INVENTOR.
ERNEST C. KARRAS
BY Delbert O Warner
ATTORNEY

United States Patent Office 3,316,502

Patented Apr. 25, 1967

3,316,502
SINEWAVE RINGING GENERATOR INCLUDING A PHASE SHIFT OSCILLATOR OPERATED IN A SATURATED MODE

Ernest C. Karras, Chicago, Ill., assignor to International Telephone and Telegraph Corporation, New York, N.Y., a corporation of Maryland Filed June 7, 1965, Ser. No. 462,021
15 Claims. (Cl. 331—108)

This invention relates to sinewave generators and especially to sinewave generators capable of providing output signals having frequencies and power levels suitable for use as ringing signals for portable switchboard systems.

Among the prior art devices are ringing generators which produce square wave outputs at low power levels. A principal shortcoming of such square wave generators, for certain purposes, arises from the nature of the square waves generated. Such square waves present high frequency wavefronts which produce stray electrical radiations which can prematurely trigger nearby low level transistorized circuits into operating modes. Another shortcoming of such square wave generators relates to their inherently low power levels, which means they are restricted to use in very small systems.

Sinewave generators of various kinds are available on the open market. For use with portable equipment, the best of these appear to be those employing silicon controlled rectifiers and special transformers to convert a square wave into a sinewave. The large number of transformers and auxiliary circuits required to enable these generators to function properly often makes them too large and costly to be practical for use with portable equipment. In addition, the commercially available generators require D.C. voltage supplies which are not compatible with the requirements of certain switchboard systems.

It is a primary object, therefore, of the present invention to provide a generator to produce low frequency sinewave signals having low distortion.

It is a further object of this invention to provide an improved low frequency sinewave generator having greater frequency and amplitude stability than heretofore.

It is yet another object of the invention to reduce the size and complexity of sinewave generators.

It is still a further object of the invention to provide a sinewave generator capable of surviving a continuous short circuit on its output for several minutes without internal damage.

The foregoing objects and others ancillary thereto may be attained by a preferred embodiment of the invention employing transistorized circuits. The initial power is provided by a phaseshift oscillator which serves to generate power at a stable frequency. The oscillator is driven, as a result of a novel design, in a saturated mode to maintain good amplitude stability in the system despite wide temperature fluctuations. Suitable emitter follower circuis are provided as high impedance sinks, as means for stepping down impedance for succeeding stages of the circuit, and as amplifier stages. Other stages of a preferred circuit include filters for suppressing distortion in the sinewave output of the phase shift oscillator and for eliminating harmonics introduced by operation of the oscillator in a saturated mode. A push-pull amplifier provides output signals free of the even harmonics. Suitable negative feedback maintains voltage regulation throughout the system at a satisfactory level.

The novel features of this invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1:
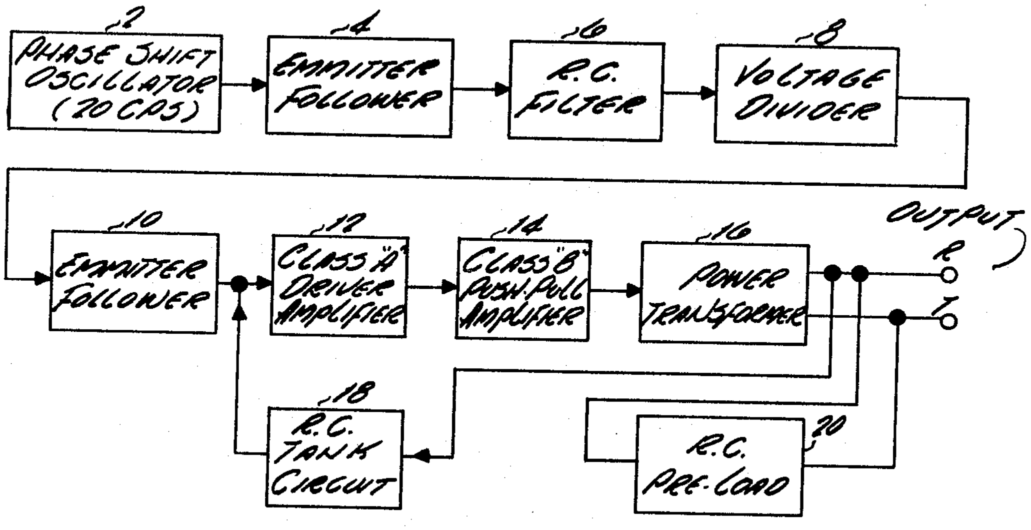
FIG. 1 is a block diagram illustrating the general arrangement of circuits according to an embodiment of the invention.
Figure 2:
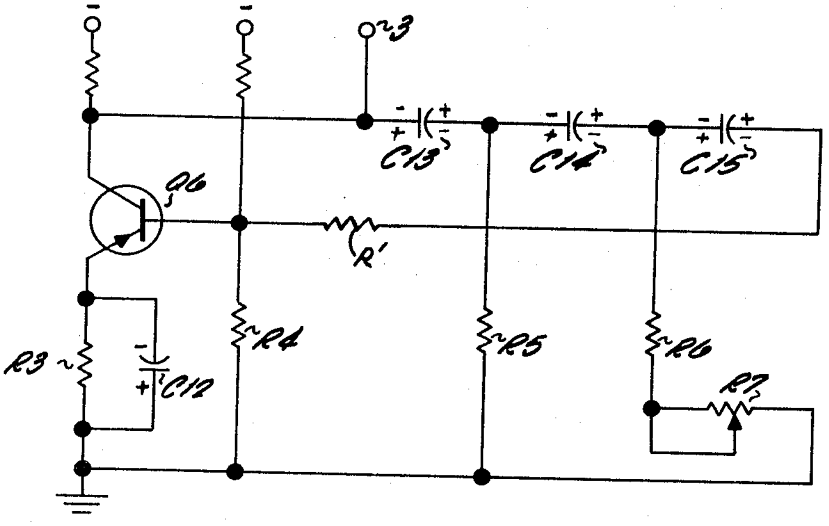
FIG. 2 is a circuit diagram illustrating a preferred embodiment of a phase shift oscillator, according to an aspect of the invention, which is capable of providing the initial power supply.

Turn now to the block diagram of FIG. 1 which illustrates a general arrangement of a preferred embodiment of the invention. The phase shift oscillator in block 2 provides a sinewave of 20 cycles per second. An embodiment of this oscillator, as shown in more detail in FIG. 2, is especially designed to operate in a saturated mode, or a clipping mode, to maintain good amplitude stability despite wide temperature variations. In addition, a particular phase shift oscillator built in accordance with this diagram provides frequency stability of approximately $\pm 2\%$ during ambient temperature variations of from $-40$ degrees Fahrenheit to $+160$ degrees Fahrenheit.

The phase shift oscillator of block 2 feeds into an emitter follower as indicated in block 4. The emitter follower serves as a high impedance sink for the output signal of the oscillator, steps down the oscillator's output impedance and amplifies the current which is then fed into the RC filter 6. The RC filter includes a resistor and two capacitors which suppress distortion in a sinewave, and eliminate those harmonics introduced by the saturation of the oscillator. The voltage divider indicated at block 8 includes a potentiometer which acts as a voltage divider to provide the proper input signal to the emitter follower of block 10. The emitter follower 10 amplifies the current and steps down the impedance to match the input characteristics of the Class A driver 12 and also isolates the oscillator and filter of the driver.

The tuned class "A" driver amplifies both its input current and voltage and supplies the necessary 20 cycle power on the input to the class B push-pull amplifier at 14, without introducing unwanted oscillations. The power to be delivered to external circuits is generated by the class "B" amplifier and is transferred to the load through a power transformer at 16. The power transformer 16 provides isolation between a load and the power circuit and raises the output voltage to the proper level. The output terminal R of the circuit is coupled through an RC tank circuit at 18 consisting of a resistor and a capacitor in parallel. The tank circuit 18 provides negative feedback to the input terminal of the class "A" driver 12 in order to maintain satisfactory voltage regulation throughout a variable load range varying between 10 ohms and 50,000 ohms and to prevent spurious oscillations. An RC preload 20 is supplied across the terminals R and T to improve the voltage regulation and prevent parasitic oscillations.

A generator constructed in accordance with the block diagram of FIG. 1 can produce a 20 cycle per second ringing signal having the form of a sinewave with a maximum amplitude of about 100 volts R.M.S. In a typical case, the ultimate power output would be approximately 18 watts at 200 ohms. The sinewave output is affected very little in the sense that it is distorted by the inductive load characteristic of telephone bells, and it is capable of ringing approximately 50 telephones simultaneously. The generator needs no warm up time before using and it is capable of surviving a continuous short circuit across its output terminals for as long as five minutes without internal damage.

FIG. 2 illustrates a phase shift oscillator of the special characteristics required for block 2 of FIG. 1. This circuit incorporates a single transistor Q6 which is coupled to suitable resistance and capacitance circuits indicated by the capacitors C13, C14 and C15 and the resistors R4, R5, R6 and R7 to provide a 180° phase shift at the frequency of oscillation desired. The resistor R7 is a potentiometer which may be varied to cause the output of the generator to extend over the range of 16⅔ c.p.s. to 20 c.p.s. The resistor R4 is selected to have between 7 and 8 times the resistance of R5 or the resistance of R6 and R7 in series. Increasing the value of the resistance R4 and decreasing the series base resistance R', in the last stage of the phase shift network (made up of capacitors C13, C14 and C15 together with the resistors R5, R6 and R4), has three effects. It decreases the amount of base drive needed; it decreases the minimum gain needed for the phase shift oscillator; and it increases the base-emitter input impedance. These factors permit the base to be driven harder and thus to run the transistor to saturation. This possibility of operating the transistor, and therefore, the oscillator, in a saturated mode is what makes it possible to maintain good amplitude stability during wide temperature variations. It should be noted that phase shift oscillators are notorious for their amplitude instability due to temperature variations. The increase in the resistance of the resistor R4 and the negligible series resistance represented by R' in the base circuit in accordance with the present invention enables the phase shift oscillator to be operated in the saturated mode to solve this problem of amplitude instability. The output of the oscillator is provided on terminal 3 for use in the emitter follower 4 of FIG. 1 or other circuits as selected.

Figure 3:
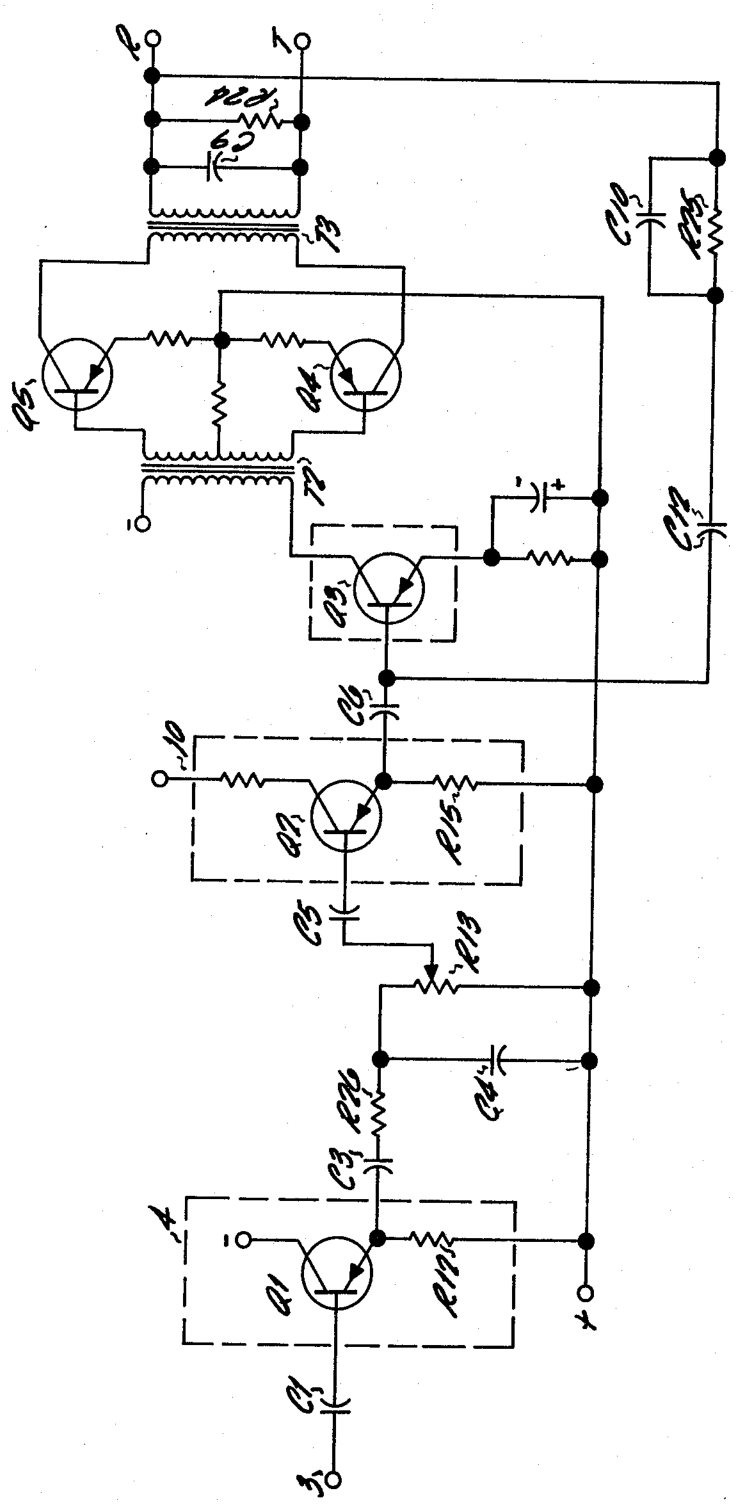
FIG. 3 is a circuit diagram illustrating a preferred embodiment of the portion of a system following the phase shift oscillator.

The circuit diagram illustrated in FIG. 3 incorporates those elements of FIG. 1 not shown by FIG. 2. Starting from terminal 3, the path of the sinewave from the phase shift oscillator 2 is through a D.C. stopping capacitor C1 to the emitter follower 4. The emitter follower 4 incorporates the transistor Q1, the emitter of which is grounded through resistor R12 and coupled to the remaining circuit through the capacitor C3, the resistor R26 and the parallel combination of the capacitor C4 and the resistor R13. As indicated in the figure, the resistor R13 is a potentiometer. The RC filter 6 of FIG. 1 comprises capacitors C3 and C4 and a resistor R26 and is provided to suppress distortion in the sinewave and to eliminate harmonics introduced by the saturation of the oscillator. Specifically, the capacitor C4 is selected to present a low impedance to higher frequencies and thus cause their amplitudes across C4 to be small.

The potentiometer R13 performs the function of the voltage divideer 8 of FIG. 1 to provide a suitably adjusted input signal through a capacitor C5 to the emitter follower 10 comprising the transistor Q2 which has its emitter grounded through the resistor R15. The output of the emitter follower is transmitted through the capacitor C6 to the class A driver amplifier including the transistor Q3. Q3 drives the transformer T2 from its collector terminal. The class B push-pull amplifier 14 comprises the transistors Q4 and Q5 which drive the power transformer T3 corresponding to block 16 of FIG. 1. The output terminals of the power transformer supply the output of the system at the terminals R and T.

The feedback circuit from terminal R through the tank circuit comprising the resistor R25 and the capacitor C10 in parallel, plus the D.C. isolation capacitor C12, provides negative feedback to maintain desired voltage regulation through the load range and to prevent spurious oscillations.

The combination of resistor R24 and the capacitor C9 acts as a preload to improve voltage regulation and prevent parasitic oscillations. The low output impedance provided by this system helps to protect the system from harm even if it is short circuited for minutes at a time. In addition, of course, suitable circuit breakers may be used to disconnect the system if the short circuit continues for more than a prescribed length of time.

While the principles of the invention have been described above in connection with specific apparatus and applications, it is to be understood that this description is made only by way of example and not as a limitation on the scope of the invention.

What is claimed is:

1. A sinewave generator comprising
a phase shift oscillator,
said phase shift oscillator incorporating a phase shift network and a transistor having as elements an emitter, a collector and a base,
a first one and a second one of said elements being coupled together by said phase shift network,
a third one of said elements being coupled to ground, said phase shift network including first, second and third capacitors shunted to ground by first, second and third resistor means,
the third resistor means including first and second resistors, said first resistor providing a resistance between the third capacitor and a terminal of the second element of said transistor,
said second resistor providing a resistance between the terminal of the second element of said transistor and ground, and
said first resistor having substantially higher resistance than said second resistor whereby said phase shift ocillator is driven in a saturated condition.

2. A sinewave generator as claimed in claim 1, in which
the first and second of said elements are the collector and the base, and
the base is connected to the third one of said capacitors through the first resistor.

3. A sinewave generator as claimed in claim 1 including an output terminal to said transistor,
said output terminal connecting through an emitter follower circuit to an additional output terminal.

4. A sinewave generator as claimed in claim 3 in which filter means is connected to said additional output terminal to reduce harmonic signals present from the oscillator and provide purer sinewaves to a filter output terminal.

5. A sinewave generator as claimed in claim 4 in which the filter output terminal is coupled through amplifier means to system output terminals,
a resistor and a capacitor, connected in parallel to each other, are coupled across the system output terminals to function as a preloading circuit,
said preloading circuit serving to reduce spurious and parasitic oscillations.

6. A sinewave generator as claimed in claim 4 in which the filter output terminal is coupled through amplifier means to system output terminals,
a resistor and a capacitor, connected in parallel to each other, are coupled between one of the system output terminals and said filter output terminal to function as a negative feedback circuit,
said negative feedback circuit serving to reduce spurious and parasitic oscillations.

7. A sinewave generator as claimed in claim 4, in which
the filter output terminal is coupled through amplifier means to system output terminals,
a resistor and a capacitor, connected in parallel to each other, are coupled across the system output terminals to function as a preloading circuit, and
a resistor and a capacitor, connected in parallel to each other, are coupled between one of the system output terminals and said filter output terminal to function as a negative feedback circuit, said preloading circuit and said negative feedback circuit serving to prevent spurious and parasitic oscillations.

8. A sinewave generator comprising:

a phase shift oscillator incorporating a phase shift network to provide an output signal, said oscillator including a transistor circuit incorporating an impedance between the base and ground which is high relative to the impedance between the phase shift network and the base whereby the transistor is driven to saturation, filter means coupled to said phase shift oscillator for receiving said output signal and for providing a filtered output signal, amplifier means having an input terminal coupled to said filter means for amplifying the filtered output signal from said filter means and for providing an amplified output signal, and feedback means coupling a selected part of said amplified output signal to the input terminal of said amplifier means to maintain voltage regulation and prevent spurious oscillations.

9. A sinewave generator as claimed in claim 8, including an emitter follower coupled between said phase shift oscillator and said filter means to step down the output impedance of the oscillator and amplify the current fed into the filter means.

10. A sinewave generator as claimed in claim 9, including a voltage divider coupling the filter means to a second emitter follower, said voltage divider thereby assuring that a suitable input signal is applied to said second emitter follower.

11. A sinewave generator as claimed in claim 8, in which the filter means includes a resistor and a capacitor coupled to receive the output signal of the phase shift oscillator and to supply the filtered output signal to the amplifier means.

12. A sinewave generator as claimed in claim 8, in which the amplifier means includes a tuned class A driver to amplify voltage and current and to provide said amplified output signal free of unwanted additional oscillations, and a class B push-pull amplifier to further amplify said amplified output signal and eliminate the even harmonics.

13. A sinewave generator as claimed in claim 12, in which the class B amplifier supplies power through a power transformer to assure isolation between the load circuit and the power circuit, and to raise the output voltage to a prescribed level.

14. A sinewave generator as claimed in claim 8, in which the phase shift network includes a variable potentiometer for varying the generator output frequency.

15. A sinewave generator as claimed in claim 8, in which a resistor and a capacitor are placed in parallel across output terminals of the generator to act as a preload to improve the voltage regulation and prevent parasitic oscillations.

References Cited by the Examiner

UNITED STATES PATENTS

| | | | | |
|---|---|---|---|---|
| 2,571,171 | 10/1951 | Van Dyke | 331—77 | X |
| 2,762,464 | 9/1956 | Wilcox | 331—77 | X |
| 2,907,955 | 9/1959 | Beck | 331—75 | X |
| 3,015,696 | 1/1962 | Herbig et al. | 331—108 | X |
| 3,247,419 | 4/1966 | Attwood | 331—111 | X |

OTHER REFERENCES

Vaughan, "Phase-Shift Oscillator," Wireless Engineer, December 1949, pp. 391–399.

ROY LAKE, *Primary Examiner.*

N. KAUFMAN, S. H. GRIMM, *Assistant Examiners.*